United States Patent [19]

Dubin

[11] 4,189,531
[45] Feb. 19, 1980

[54] NA/S REACTANT CONTAINER WITH PROTECTIVE RESIN COATING

[75] Inventor: Robert R. Dubin, Charlton, N.Y.

[73] Assignee: Electric Power Research Institute, Inc., Palo Alto, Calif.

[21] Appl. No.: 954,961

[22] Filed: Oct. 26, 1978

[51] Int. Cl.$^2$ ............................................. H01M 2/32
[52] U.S. Cl. ..................................... 429/104; 29/623.5
[58] Field of Search ............... 429/102, 104, 122, 191; 29/623.1, 623.5

[56] References Cited

U.S. PATENT DOCUMENTS

| | | | |
|---|---|---|---|
| 3,982,959 | 9/1976 | Partridge et al. | 429/104 |
| 4,048,391 | 9/1977 | Tilley et al. | 429/104 |
| 4,053,689 | 10/1977 | Breiter | 429/122 |
| 4,070,527 | 1/1978 | King et al. | 429/191 |
| 4,110,515 | 8/1978 | Gupta | 429/104 |
| 4,110,516 | 8/1978 | Breiter | 429/104 |
| 4,117,209 | 9/1978 | Markin et al. | 429/104 |

*Primary Examiner*—Donald L. Walton
*Attorney, Agent, or Firm*—Bertram I. Rowland

[57] ABSTRACT

In a sodium-sulfur battery, surfaces of electrically conducting aluminum in contact with sulfur-polysulfide mixtures or potentially subject to contact with such mixtures are protected from the formation of a nonconductive aluminum sulfide coating by a thin coat of electrically-conducting phenolic or poly(arylacetylene) resin which is inert to the sulfur-polysulfide mixture and adheres strongly to the aluminum surface under the conditions of use of the aluminum substrate.

11 Claims, No Drawings

NA/S REACTANT CONTAINER WITH PROTECTIVE RESIN COATING

BACKGROUND OF THE INVENTION

1. Field of Invention

In the attempt to develop new technologies for economical storage of energy and to find possible solutions to the storage of electrical energy, the sodium-sulfur battery is considered promising in that it offers many advantages. The operating principles as well as the unique advantages of the sodium-sulfur-solid electrolyte battery have been discussed by Marcoux and Seo, "Sodium-Sulfur Batteries", Advan. Chem. Ser. No. 140,216 (1975).

Sulfur which forms the cathode is a non-conductor and, therefore, means must be provided for the transfer of electrons to and from the sulfur on charging and discharging. In addition, conventional structural metals are susceptible to corrosive attack by the sulfur/polysulfide melt present in the sulfur electrode container.

While aluminum, for many reasons, is a desirable choice for use as the container material for the sodium-/sulfur battery, aluminum forms sulfide layers with poor conductivity when exposed to sulfur/polysulfide melts. Therefore means must be provided for allowing for efficient, stable, lasting low resistance transmission of electricity from the sulfur electrode to the aluminum container or other external conductor.

2. Description of the Prior Art

Gadd, Nejedlik, and Graham, "Vacuum, Pack and Slurry Coating Processes for Coating Superalloys," Electrochem. Tech, 6 (9010, 307–315) 1968; Smialek, "Exploratory Study of Oxidation-Resistant Aluminized Slurry Coatings for IN-100 and WI-52 Superalloys" (NASA'TN'D'6321 (1971)), and Llewelyn, "Protection of Nickel-Base Alloys Against Sulfur Corrosion by Pack Aluminizing," *Hot Corrosion Problems Associated with Gas Turbines*, ASTM-STP-421 (September 1967) all teach the preparation of metal aluminide coatings and their application as protective coatings for superalloys in high temperature turbines.

The problems specific to the use of metallic components in sodium-sulfur batteries are described in U.S. Pat. No. 3,982,959. There have been attempts at various mechanical and chemical means for providing electrical transmission from the sulfur electrode to the aluminum container, such as those described in U.S. Pat. No. 4,053,689. See also U.S. Pat. No. 4,070,527.

SUMMARY OF THE INVENTION

In a sodium-sulfur battery employing aluminum surfaces for electrical conduction, where such surfaces are subject to corrosive attack by sulfur-polysulfide melts, a thin inert electrically-conducting coating of a phenolic or polyarylacetylene resin layer is applied to the aluminum surface. The resulting coating provides for lasting stable low resistance transmission of electricity through the coated aluminum conductor. Electrical conductance is imparted to the resin by compounding the resin with electrically conductive carbon or graphite in various forms.

DESCRIPTION OF SPECIFIC EMBODIMENTS

Improved sodium-sulfur batteries are provided by coating electrically conducting aluminum components subject to corrosive attack by sulfur-polysulfide melts with a thin layer of an electrically conducting phenolic or polyacetylene resin. The resin contains a sufficient amount of conducting carbon or graphite transmit electricity from the sulfur electrode to the aluminum surface. The resins strongly adhere to aluminum and prevent corrosive attack and formation of a nonconducting aluminum sulfide layer.

The coatings used in the subject invention are conducting carbon or graphite containing phenolic resins or polyarylacetylene resins, which are thermosetting at 100°–300° C.

The phenolic resins are copolymers of phenol and formaldehyde, where the phenol can have from 0 to 2 alkyl substituents of from about 1 to 10 carbon atoms. The phenolic resin will have a viscosity of 700–1000 cps by the WC-31-I test method (25° C., 52–56 weight percent in ethanol).

The resin can be employed as a solution in an organic oxygenated solvent of from about 1 to 4 carbon atoms, particularly alkanols and ketones e.g. methanol, ethanol, methylethylketone and butanol.

The poly(arylacetylene) polymers useful in the subject invention are reported in U.S. Pat. No. 4,070,333. The portions set forth in column 3, line 37 to column 4, line 42 are incorporated herein by reference.

The poly(arylacetylene) polymer composition comprises a blend of a polyacetylenically unsaturated prepolymer and from about 2 about 70% by weight of the prepolymer of a fluidizer, which is a monomeric acetylenically unsaturated aromatic compound having a melting point below about 185° C. and a boiling point above 250° C.

The polyacetylenically unsaturated prepolymer is a polymer of at least one polyacetylenically substituted aromatic compound, such as diethynylbenzene, which prepolymer has a number average molecular weight of about 900 to 1200 and contains about 25% by weight of acetylenic groups. Typically monomeric acetylenic aromatic compounds which are blended with a prepolymer are diphenylacetylene and diphenylbutadiyne. Additional exemplary compounds may be found in U.S. Pat. No. 4,070,333, column 2, lines 38 to 60 and column 5, line 67 to column 6, line 13.

Preferred mixtures of the polyacetylenically substituted aromatic compounds are that of diethynylbenzene with diphenylbutadiyne or phenylacetylene. The diethynylbenzene component may be m-diethynylbenzene, p-diethynylbenzene or mixtures thereof.

When the mixture includes diphenylbutadiyne, that component constitutes from about 30 to about 75 percent by weight of the total mixture. The resulting copolymers contain about 30 percent to about 75 percent by weight of diphenylbutadiyne-derived units since the diphenylbutadiyne component enters the copolymer at substantially the same rate as the diethynylbenzene component.

The resin is provided as a fluid composition of the prepolymer in the acetylenic fluidizer. The resin is cured at temperatures in the range of about 40° to 200° C., more usually from about 90° to 165° C.

The resins are combined with an electrically conducting carbonaceous material, particularly graphite or carbon. The carbonaceous material will be present in from about 3 to 60 weight percent, preferably in from about 30 to 50 weight percent. Preferably, the carbonaceous material is graphite.

The conductive carbonaceous material may be combined with the resin in a variety of manners. Conveniently, graphite particles of from about 1 to 10 microns, more usually about 5 microns in diameter can be mixed with the resin. Alternatively graphite mat, felt or paper can be impregnated with the resin. The graphite mat or paper will normally have filaments of from about 6 to 10 microns and thicknesses of from about 5 to 10 mils, respectively. The carbonaceous material containing resin is applied to the aluminum surface to be protected by any convenient means, and the resin cured. Preferably a combination of graphite particles and resin impregnated mat is employed.

Before applying the resin to the aluminum surface, normally the surface will be cleaned of any rust, grease or dirt to assure proper adherence and uniformity. The resin layer will generally be from about 0.5 to 5 mils, preferably from about 1 to 2 mils in thickness.

Typically, the conducting resin will be applied to surfaces which may be subject to contact with the sulfur-polysulfide melts. Such components include the sulfur electrode container, electrical contacts, or other material which is employed for the transmission of electricity to and/or from the electrodes. The resin may be applied by spraying, painting, rolling, etc., or by affixing to the surface when employing impregnated mat.

EXPERIMENTAL

The following examples are offered by way of illustration and not by way of limitation.

EXAMPLE 1

In order to exemplify the subject invention a cathode container made of aluminum (1 inch O.D. and 4 inches long) was coated with Dylon Grade HE, a suspension of graphite crystals in Bakelite ® phenolic resin solution BKS-2600 supplied by Union Carbide; Dylon Grade HE is supplied by Dylon Industries of Cleveland, Ohio). The coating was applied by spray techniques to a clean, vapor blast surface. Several separate applications were made to assure proper adhesion and uniformity. A cure cycle of one hour at 100° C. followed by three hours at 250° C. was applied. The final coating was from about 1 to 2 mils thickness. The phenolic resin coated cathode container was cycled as a cathode container in a standard design sodium/sulfur cell for two weeks. A similar structure was cycled in a laboratory test apparatus. The resin coated cathode container showed superior operating performance when compared to uncoated specimens. The effectiveness of the invention was demonstrated by the absence of both subsurface attack and disruption of the phenolic resin coating in these experiments. The conductive phenolic resin coated surface was found to be inert to the sulfur/polysulfide melt and continued to be electrically conductive.

EXAMPLE 2

To further test the present invention aluminum cathode containers similar to the one described above were successfully coated on the interior surfaces with poly(arylacetylene) resins, Hercules Resins H-111 and H-112 (supplied by Hercules Incorporated of Wilmington, Delaware) which had each been loaded with 50 weight percent graphite. The cure cycle for these resins was 2 hrs at 150°-200° C. and 1 hr at 250°-300° C. In addition, composite structures comprising aluminum surfaces with graphite cloth (MAT 32) adhered to them by means of the graphite filled Hercules H-111 and H-112 resins were successfully made. The stability of the graphite filled H-111 and H-112 resins was demonstrated in molten sulfur at 350° C. for at least 600 hrs by no signs of degradation. Samples of the composite structures were cycled in molten sodium polysulfide at 350° C. for up to 140 hrs at 80 ma/cm$^2$ with satisfactory performance.

EXAMPLE 3

Other testing was carried out utilizing the graphite filled phenolic resin (Dylon Grade HE) employed in Example 1. In addition, various tests were carried out in which a graphite paper (Grafoil supplied by Union Carbide) or graphite cloth was impregnated with the conductive resin.

The tests involved subjecting the various electrically-conducting resins to conditions which simulate the operating conditions of a sodium-sulfur battery. Specifically, aluminum was coated with the resin or resin-paper composite. The electrically-conductive resins were tested in molten sodium polysulfide at various temperatures, current densities and time. The parameters and results are set forth in Table 1. From the lack of degradation and from the generally satisfactory performance during testing, one skilled in the art would conclude that the materials tested will operate successfully in actual Na/S cells.

TABLE 1

| Temp. | Current Density | Embodiment Tested | Cycling Time | Results |
|---|---|---|---|---|
| 350° C. | 30ma/cm$^2$ | Dylon Grade HE Resin plus graphite cloth | 120hrs | Superior operating performance |
| 350° C. | 30ma/cm$^2$ | Dylon Grade HE Resin plus Grafoil* | 210hrs | Superior operating performance |
| 350° C. | 30ma/cm$^2$ | Dylon Grade HE Resin on Al substrate | 160hrs | Superior operating performance |
| 300° C. | 20ma/cm$^2$ | Dylon Grade HE Resin on Al substrate | 336hrs | Superior operating performance |
| 300° C. | 20ma/cm$^2$ | Dylon Grade HE Resin plus graphite cloth | 24hrs | Test aborted after furnace failure |

*Grafoil ®, a product of Union Carbide, is a graphite paper.

Although the foregoing invention has been described in some detail by way of illustration and example for purposes of clarity and understanding, it will be obvious that certain changes and modifications may be practiced within the scope of the appended claims.

What is claimed is:

1. An improved sodium-sulfur battery having an electrically conducting aluminum surface subject to corrosive attack by the sulfur electrode, the improvement comprising
    said aluminum surface coated with a thin layer of a cured phenolic or poly(arylacetylene) polymer containing from about 3 to 50 weight percent of electrically conducting carbonaceous particles.

2. A battery according to claim 1, wherein said layer includes an electrically conducting carbonaceous mat, felt, cloth or paper in said resin.

3. A battery according to claim 1 wherein said carbonaceous particles are graphite.

4. An improved sodium-sulfur battery having an electrically conducting aluminum surface subject to corrosive attack by the sulfur electrode, the improvement comprising:

said aluminum surface coated with a layer of from about 0.5 to 5 mils of a cured phenol-formaldehyde resin containing from about 3 to 50 weight percent of electrically conducting graphite particles.

5. An improved sodium-sulfur battery according to claim 4, wherein said layer includes an electrically conducting carbonaceous mat, felt, cloth or paper in said resin.

6. An improved sodium-sulfur battery having an electrically conducting aluminum surface subject to corrosive attack by the sulfur electrode, the improvement comprising:

said aluminum surface coated with a layer of a thickness of about 0.5 to 5 mils of a poly(arylacetylene) resin containing from about 3 to 50 weight percent of electrically conducting graphite particles.

7. An improved sodium-sulfur battery according to claim 6, wherein said layer includes an electrically conducting carbonaceous mat or paper in said resin.

8. A method for preventing corrosive attack of aluminum components of a sodium-sulfur battery while maintaining electrical conductivity to said aluminum component which comprises:

fabricating an electrically conducting component for a sodium-sulfur battery from aluminum;

coating at least a portion of said aluminum component with a layer of a thickness of from about 0.5 to 5 mils of a phenolic or poly(arylacetylene) resin containing from about 3 to 50 weight percent of electrically conducting carbonaceous particles; and assembling said sodium-sulfur battery with said component.

9. A method according to claim 8 wherein said resin is a phenolic resin.

10. A method according to claim 8, wherein said resin is a poly(arylacetylene) resin.

11. A method according to any of claims 9 and 10, wherein said carbonaceous particles are graphite and said curing is at a temperature in excess of about 100° C.

* * * * *